US008559617B2

(12) United States Patent
Cramer et al.

(10) Patent No.: US 8,559,617 B2
(45) Date of Patent: Oct. 15, 2013

(54) VENDOR FACILITY CUSTOMER ASSIGNMENT

(75) Inventors: Brent Cramer, Colorado Springs, CO (US); Tyson Black, Hayward, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1220 days.

(21) Appl. No.: 11/961,243

(22) Filed: Dec. 20, 2007

(65) Prior Publication Data

US 2009/0161857 A1    Jun. 25, 2009

(51) Int. Cl.
*H04M 3/00* (2006.01)
*H04M 5/00* (2006.01)

(52) U.S. Cl.
USPC ............ 379/265.11; 379/265.01; 379/265.05; 379/265.13

(58) Field of Classification Search
USPC .................. 379/243, 265.01, 265.02, 265.11, 379/265.13, 265.05, 266.07, 207.12, 207.15
See application file for complete search history.

(56) References Cited

U.S. PATENT DOCUMENTS

| 5,703,943 | A  | * | 12/1997 | Otto | 379/265.11 |
| 7,305,350 | B1 | * | 12/2007 | Bruecken | 705/346 |
| 2007/0147599 | A1 | * | 6/2007 | Sharpe et al. | 379/265.02 |
| 2007/0160188 | A1 | * | 7/2007 | Sharpe et al. | 379/265.01 |
| 2008/0154706 | A1 | * | 6/2008 | Bruecken | 705/10 |

* cited by examiner

*Primary Examiner* — Thjuan K Addy (57) ABSTRACT

A system and method may be configured for assigning initiated communications to a particular branch, location, or facility associated with a vendor. An exemplary system may include an assignment server in communication with a data network that includes a primary data line for a vendor having a plurality of associated vendor facilities. The system further may include a plurality of vendor facility data lines, each of which is associated with one of the vendor facilities. The assignment server is configured to locate a group of vendor facilities from the plurality of vendor facilities that are within a predetermined range of a location associated with the initiated communication. The assignment server is further configured to assign one of the eligible vendor facilities to the initiated communication and connect the initiated communication with the vendor facility data line of the assigned vendor facility.

24 Claims, 3 Drawing Sheets

VENDOR FACILITY CUSTOMER ASSIGNMENT

BACKGROUND

Business organizations such as vendors have a number of branches or franchises, e.g., vendor facilities, may advertise uniformly across the geographic areas in which they maintain their facilities. Typically such advertising entails little, if any, specific contact information for each specific vendor facility, as this is often impractical, especially where the vendor maintains many facilities across cities, states, or even countries. Rather, the vendors may rely on the individual facilities to each communicate contact information on a local basis to potential customers. For example, each facility may register their specific contact information, e.g. a telephone number, address, etc., with a local business directory and/or advertise on a local level to make potential consumers aware of the presence of that particular branch, and how to contact them. This effectively requires customers seeking assistance from the vendor to seek out contact information for a local facility themselves.

The process of developing a local customer base for each facility in a network of a particular vendor, even with a generally uniform global advertising strategy, nevertheless relies at least in part upon efforts of the potential customers in locating contact information for a particular branch. As the individual branches may be effective to varying degrees in their efforts to locally advertise and communicate contact information to potential customers, the vendor may have difficulty developing a uniform customer base across geographic areas where several branches are located. Additionally, customers may be frustrated when they attempt to contact a branch that may be physically closer, and thus are assumed by the customer to be the most convenient for them, when in reality the closer branch is preoccupied or less effective at providing the desired services or goods. At times, other nearby branches may in actuality more effectively serve the customer's needs. Further, where any differences exist in the level of goods or services offered by local vendor branches, customers will be generally forced to communicate individually with each branch to determine whether their needs for particular goods or services can be met by that particular branch.

Accordingly, there is a need for enabling potential customers of a business organization with different geographic locations to contact an appropriate local branch associated with the business organization without requiring the customer to seek out contact information for a particular branch.

DETAILED DESCRIPTION

Various examples of a system and method for assigning initiated communications by a user, e.g., telephone calls, to a particular branch, location, or facility associated with a vendor are disclosed. An exemplary system may generally include an assignment server in communication with a data network such as a telephone network that includes a primary data line for a vendor having a plurality of associated vendor facilities. The system further includes a plurality of vendor facility data lines, each of which is associated with one of the vendor facilities. The assignment server is configured to locate a group of vendor facilities from the plurality of vendor facilities that are within a predetermined range of a location associated with the user or initiated communication. The assignment server is further configured to assign one of the eligible vendor facilities to the user or initiated communication, and connect the initiated communication with the vendor facility data line associated with the assigned vendor facility.

An exemplary illustration of a method includes receiving data such as in the form of a phone call placed by a user to a primary data line, for example a phone line, associated with a vendor having a plurality of associated vendor facilities, determining a location associated with the user, and determining a group of vendor facilities located within a predetermined range of the location from the plurality of vendor facilities. The method further includes assigning one of the vendor facilities identified within the predetermined range to the user, and connecting the user with the data line of the assigned vendor facility.

Figure 1:
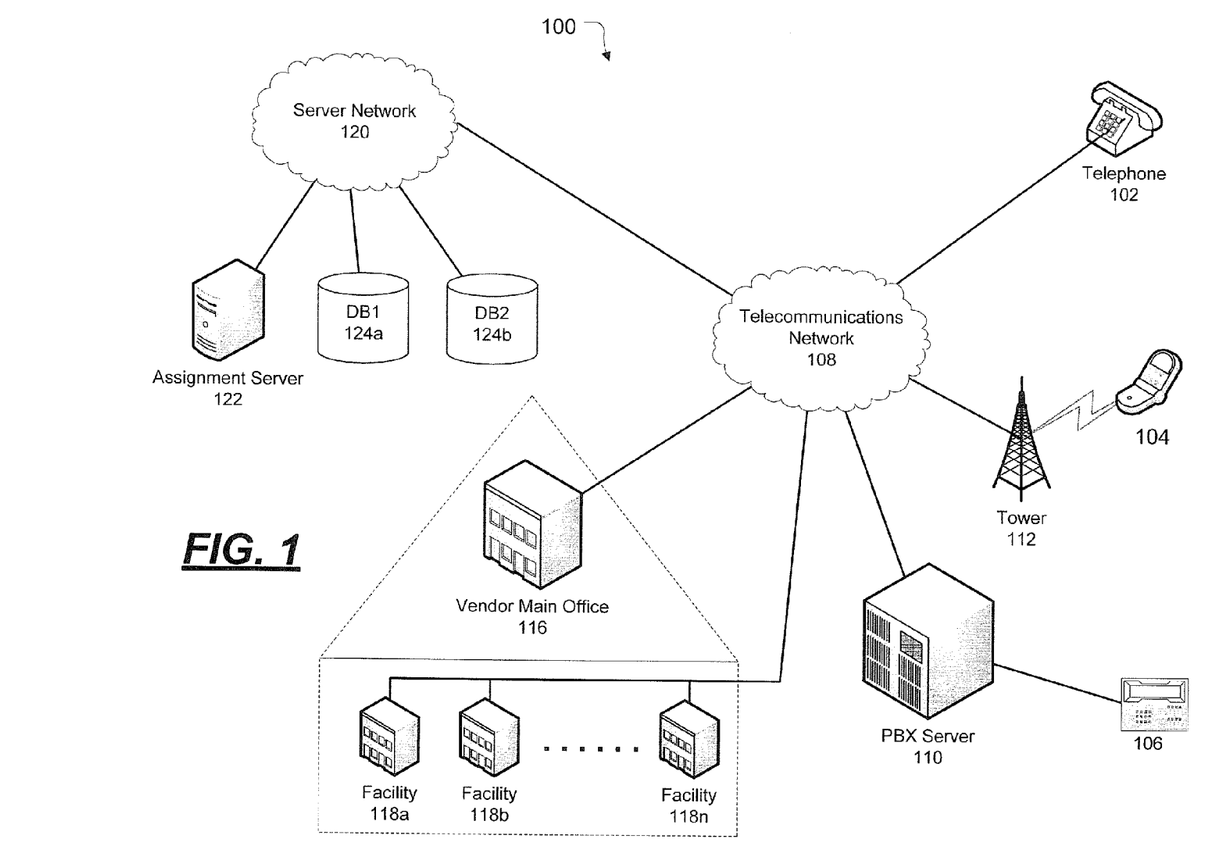
FIG. 1 illustrates an exemplary architecture of a communication system including an assignment server.

FIG. 1 illustrates a general architecture and operation of a telecommunications system 100, according to an embodiment. System 100 generally includes an assignment server 122 in communication with a vendor main office 116 and a plurality of vendor facilities 118a, 118b, . . . 118n (collectively, 118) via one or more data networks shown in general terms by a telecommunications network 108. A user, e.g., a potential customer, may initiate contact such as by way of a phone call or data connection to the vendor main office 116 with any of a variety of telecommunications devices, e.g., telephones 102, 104, 106, as further described below. The assignment server 122 generally assigns a particular vendor facility 118 to handle the particular incoming communication to the vendor main office 116, as will be described further below. Accordingly, customers may be generally routed to an assigned vendor facility 118 without intervention by personnel of the vendor main office 116, or knowledge of the user.

Any variety of communications or telephone devices may be employed by a user to initiate a phone call to vendor main office 116. For example, conventional telephone 102, wireless device 104, and private business exchange (PBX) phone 106 may each place and receive calls over telecommunications network 108 in system 100, and particularly may place calls to vendor main office line 116. Vendor main office line 116 may be a toll-free phone line, hotline or other telephone or data line, whether wired or wireless, allowing a generally single point of contact for customers using devices 102, 104, 106. Further, a plurality of vendor facilities 118, e.g., branches that are part of a distribution chain of the vendor, may each have separate data lines that may receive communication from any of devices 102, 104, 106, at least as directed by assignment server 122. Although not specifically illustrated in FIG. 1, vendor main office line 116 and vendor facility lines 118 may each have telephones or other communications devices associated therewith for receiving and initiating communications such as telephone calls across network 108 from/to devices 102, 104, 106.

Conventional telephone 102 may be any land-line telephone, of which a variety of examples are known. Conventional telephone 102 may generally communicate through any Public Switched Telephone Network (PSTN). Wireless device 104 may be a wireless telephone, although other kinds of telecommunications devices may be included in various approaches. For example, wireless device 104 could include a variety of devices used to place and receive calls and transmit or receive other data communications such as personal computers, laptop computers, handheld computers, personal digital assistants, wireless e-mail devices, or devices that include some combination of a computer and a telephone. PBX phone 106 may function as a part of a PBX network including PBX server 110, which is also generally known. Each of devices 102, 104, 106 may generally communicate through telecommunications network 108 using SS7 signaling, as an example. Further, other telecommunications devices which are well known may be implemented in system 100. For example, a Voice over Internet Protocol (VoIP) device may be implemented in system 100, and may communicate with various telecommunications devices over system 100 as is generally known.

Although a single one of the telecommunications devices 102, 104, 106 are shown, there may be a large number of telecommunications devices 102, 104, 106 in communication with or through system 100 at any given time. Similarly, FIG. 1 depicts a single tower 112 to allow wireless device 104 to communicate with system 100, although it is to be understood that system 100 likely will include hundreds if not thousands of towers 112. Further, FIG. 1 illustrates one PBX server 110 which allows PBX phone 106 to communicate with system 100, although in practice system 100 will likely include a great number of PBX servers 110 and associated PEX phones 106. Moreover, FIG. 1 should not be interpreted to suggest that there is necessarily any geographic limitation to system 100. In fact, system 100 may facilitate communications between different cites, states, and even countries.

Communications through system 100 may be initiated, for example, when a call is placed by a user of conventional telephone 102, as is generally well known. Conventional telephone 102 may be in communication with telecommunications network 108 through a PSTN linked using SS7 signaling. As an example, conventional telephone 102 may initiate a call which may be transferred through telecommunications network 108. SS7 signaling provided by telecommunications network 108 may provide supervising, alerting, and addressing functions. Telecommunications network 108 may be a packet-switched network, such as an internet protocol (IP) network in combination with a circuit-switched network such as the public switch telephone network (PSTN). Accordingly, it is to be understood that network 108 includes switches, links, gateways, etc., as necessary to facilitate the transmission of calls and data between device 102 and vendor main office line 116, or vendor facility lines 118.

Wireless device 104 generally communicates with local tower 112 within range of device 104. Tower 112 may transmit communication signals from device 104 to a Mobile Telephone Switching Office (MTSO, not shown). Each MTSO is associated with one or more towers 112 and each generally simultaneously or nearly simultaneously handles communications for a plurality of wireless devices 104, including at least monitoring all communications, e.g., calls, tracking the location of each device 104, e.g., phone, and arranging handoffs between the various towers as may be necessary. Wireless device 104 may be generally linked to other telecommunications devices including PBX server 110, telephone 102, another wireless device 104, etc., by a telecommunications network 108, as is well known.

Communication signals from wireless device 104 are transmitted via network 108 when a user of a device 104 places a call to vendor main office line 116. Network 108 generally routes calls from device 104 through a circuit-switched or packet-switched network to a receiver device such as a phone associated with vendor main office 116 or vendor facilities 118. Further, wireless device 104 may communicate with conventional telephone 102, PBX phone 106, or another wireless device (not shown).

Communications through system 100 may also be initiated when a call is placed by PBX phone 106. As an example, PBX phone 106 may initiate a call which may be switched through PBX server 110, as is generally known. PBX server 110 subsequently communicates over telecommunications network 108 with vendor main office line 116, or vendor facility lines 118. Further, PBX phone 106 may communicate with any other telecommunications device such as wireless device 104, conventional telephone 104, or other PBX phone 106.

As further described below in regard to process 200, server network 120 generally detects incoming communications such as calls to vendor main office line 116 from each of devices 102, 104, 106. Server network 120 may subsequently notify assignment server 122 of the incoming call. Assignment server 122 may then assign a vendor facility 118 that is within a predetermined range of a customer using one of devices 102, 104, 106. Assignment server 122 further may connect the call to the assigned vendor facility lines 118, as will be described below. Databases 124a, 124b (collectively, 124) may be provided on other nodes of server network 120, and may provide various data regarding vendor facilities 118 and/or devices 102, 104, 106 as further described below. Databases 124 generally are relational database systems that allow for storage and retrieval of tables identifying locations of various vendor facilities 118, and assignments of devices 102, 104, 106 to respective vendor facilities, as will be described further below.

Assignment server 122 and databases 124 may include any one of a number of computing devices known to those skilled in the art, including, without limitation, a computer workstation, a desktop, notebook, laptop, or handheld computer, or some other computing device known to those skilled in the art. Computing devices such as the foregoing may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Arnmonk, N.Y., and the Linux operating system.

Computing devices in various embodiments such as assignment server 122 and/or databases 124 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, egg., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Assignment server 122 includes logic or a heuristic for determining an eligible group of vendor facilities 118 associated with a vendor main office 116 that are located within a predetermined range of devices 102, 104, 106 when a user employs one of the devices 102, 104, 106 to initiate a phone call to vendor main office line 116. Assignment server 122 may determine a location, or approximation thereof, from a caller identification, e.g., a phone number or NPANXX designation (i.e., an area code and first three digits of a telephone number associated with device 102, 104, 106), and determine whether any vendor facilities 118 are located within a predetermined range. For example, assignment server 122 may use a caller's NPANXX identification to determine a location of a device 102, 104, 106. Wireless devices 104, as an alternative, may provide a current location signal, e.g., a GPS tracking signal, which indicates a current position of the wireless device 104. In the case of communications that may take place by way of the Internet, location information associated with an Internet Protocol (IP) address may be potentially used. As yet another example, a user may be asked to provide geographic location information as part of the communication. Once receiving the location information, assignment server 122 then determines a list of "eligible" vendor facilities 118 that are within a predetermined range of the user, and thus would potentially be capable of offering goods or services to the user. The predetermined range may be any range that is convenient, and preferably accounts for a particular distribution of vendor facilities 118 in the area of the user. For example, a smaller range may be employed if the user is located in an area where a substantial number of vendor facilities 118 are located, in order to prevent creating a list of eligible vendor facilities 118 that is overly large. Further, a range is preferably large enough to generate multiple eligible vendor facilities 118 when a user calls, to ensure multiple facilities are identified as options for the user. Accordingly, the predetermined range preferably accounts for general characteristics of a network of associated vendor facilities in the area of a device 102, 104, 106, i.e., whether vendor facilities 118 are relatively concentrated or sparsely distributed.

Assignment server 122 additionally is configured to assign one of the eligible vendor facilities to the user. Assignment server may employ a variety of methodologies for assigning vendor facilities 118 to an initiated communication and/or device 102, 104, 106. For example, assignment server 122 may select one of the eligible vendor facilities randomly. This methodology may be particularly useful where a large number of vendor facilities are concentrated in a small area, and/or the vendor wishes to distribute incoming phone calls generally evenly amongst its network of vendor facilities in a given area. As an alternative methodology, assignment server 122 may determine a distance between the location of the user and each of the eligible vendor facilities 118, and assign the vendor facility 118 that is closest in relation to the user's location. As yet another alternative, an assignment server 122 may assign a vendor facility 118 based upon a relative capacity of each of the eligible vendor facilities 118. For example, the various vendor facilities 118 may each provide an indication to assignment server 122 of their respective capacity for additional customers, or an indication that the telephone line associated with the vendor facility is open or busy, etc., in order to indicate whether a particular vendor facility can handle an incoming call from a potential customer.

Figure 2A:
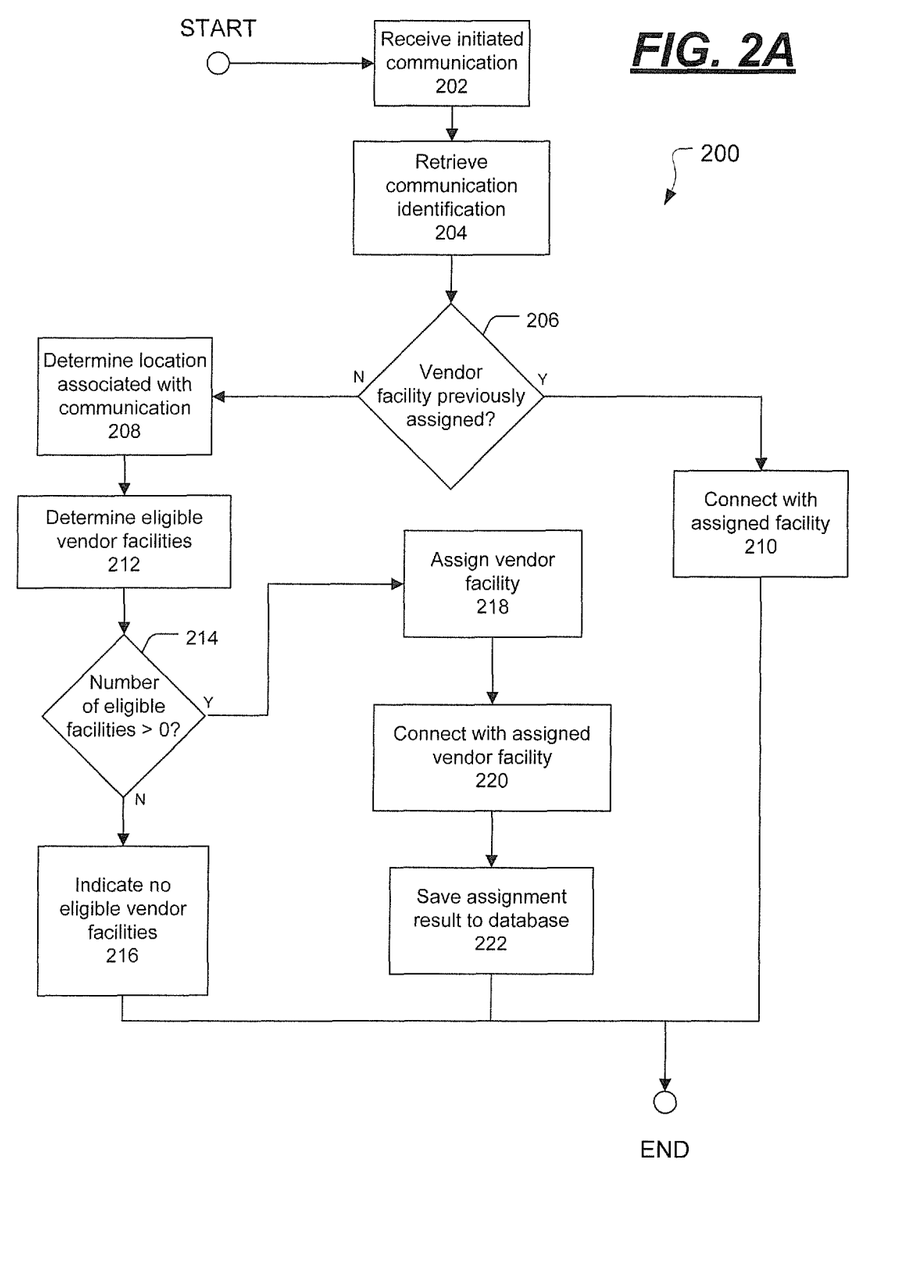
FIG. 2A illustrates an exemplary process for assigning a user to a specific vendor facility.
Figure 2B:
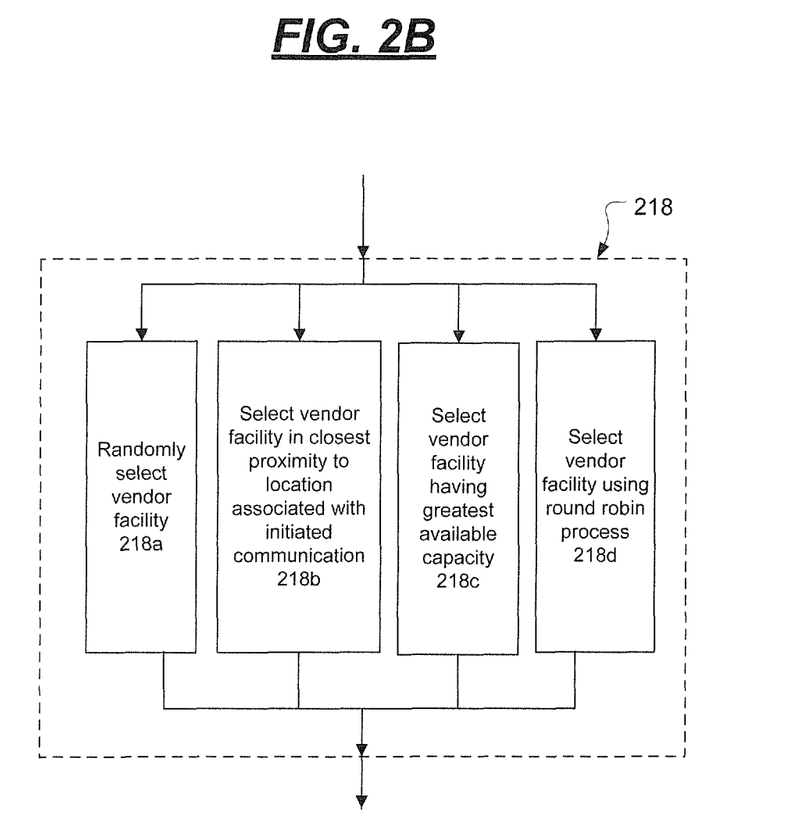
FIG. 2B illustrates a portion of the exemplary process shown in FIG. 2A.

Turning now to FIGS. 2A and 2B, a process 200 for assigning users to a vendor facility is illustrated. Process 200 may begin at step 202, where a communication such as a phone call is received. For example, a communication may be initiated by a user via conventional telephone 102, wireless device 104, or PBX phone 106, as described above, or any known communications device. Further, server network 120 and/or assignment server 122 may generally detect incoming calls to a vendor main office line 116. Process 200 may then proceed to step 204.

In step 204, a communication identification may be retrieved by assignment server 122. For example, as described above, assignment server 122 may retrieve a caller identification, e.g., an NPANXX designation associated with conventional telephone 102, wireless device 104, or PBX phone 106. Assignment server 122 may alternatively determine a present location of a wireless device 104 other than by its NPANXX designation, e.g., using a tracking signal indicating a position of wireless device 104. Process 200 may then proceed to step 206.

In step 206, assignment server 122 may query whether the device 102, 104, 106 already has a vendor facility assigned. For example, previous caller information may be stored in databases 124, as described above. Accordingly, assignment server 122 may check databases 124 for the data identifying the caller and an assigned vendor facility. If the caller is not currently assigned to a vendor facility, i.e., the user has not previously called the vendor main office line 116, then process 200 may then proceed to step 208. If however, the caller does exist in a previous caller table, e.g., the user has an established relationship with an existing vendor facility 118a, process 200 proceeds to step 210, where assignment server 122 connects the caller with the previous vendor facility 118a. Accordingly, once a given user calls vendor main office 116 using a particular device 102, 104, 106, and is assigned to a particular vendor facility 118a, subsequent calls from the same device 102, 104, 106 may generally automatically route the call to the previously assigned vendor facility 118a. Process 200 may then proceed to step 208.

In step 208, assignment server 122 may determine a location associated with the initiated communication. For example, assignment server 122 may employ caller ID information, e.g., an NPANXX designation associated with device 102, 104, 106, to determine a location associated with device 102, 104, 106. Any other method of supplying location information may be provided. For example, wireless device 104 may indicate a current location of the wireless device 104, as NPANXX information will generally be relevant only to a home location associated with the wireless device 104. Accordingly, any other method of providing a location, either a present location or a home location associated with device 104, or a location associated with devices 102, 106, may be employed. Process 200 may then proceed to step 212.

In step 212, assignment server 122 may determine eligible vendor facilities 118 that may be assigned to the initiated communication or user of device 102, 104, 106. For example, assignment server 122 may determine a number of vendor facilities 118 that exist within a predetermined range of the device 102, 104, 106. As described above, the predetermined range may take into account characteristics of a particular network of vendor facilities 118 associated with a vendor, in order to provide a manageable list of eligible vendor facilities 118 that can provide adequate service to the user. Process 200 may then proceed to step 214.

In step 214, process 200 may query whether the number of eligible facilities identified in step 212 exceeds zero. In other words, step 214 generally determines whether any facilities are within the predetermined range. If the number is not greater than zero, process 200 may proceed to step 216, where a message may be played to the caller indicating that no eligible vendor facilities are within range. Alternatively, or in addition, assignment server 122 may reconnect the caller with a main line associated with vendor main office 116, in order to provide further assistance. If however, there is at least one acceptable available facility associated with the business organization within range, process 200 then proceeds to step 218.

In step 218, a vendor facility is assigned to the caller. Step 218 may be customized according to the particular needs of a vendor, and a strategy they may wish to employ for directing inquiries of potential customers to their associated vendor facilities. Various examples are shown in FIG. 2B. For example, one of the eligible vendor facilities 118 identified in step 212 may be selected at random, as in step 218a. This may be desirable, for example, where a vendor has a large number of facilities in a very small geographic area, such that any of the eligible vendor facilities would be generally as convenient in terms of proximity to the user as the others. Further, randomly distributing assignments of vendor facilities 118 across a pool of users in a particular area will tend to generally evenly distribute calls amongst the vendor facilities. Additionally, as the predetermined distance between the device 102, 104, 106 and the vendor facilities 118 generally screens out facilities 118 that are impractically far away from the user, e.g., in step 212, each vendor facility 118 will receive a share of incoming calls from new customers generally in proportion to the population of surrounding areas.

Alternatively, in step 218b, a vendor facility may be assigned to a caller based upon the relative proximity of each of the vendor facilities to the caller. For example, assignment server 122 may simply assign a vendor facility 118 that is closest in distance to the caller, as compared with the other eligible vendor facilities 118. This example may be most useful where vendor facilities 118 are generally widely distributed, and only one particular vendor facility 118 is likely to be convenient for a user in terms of proximity.

As another alternative, in step 218c a vendor facility 118 may be assigned based upon an available capacity of vendor facilities 118, as illustrated in step 218c. For example, vendor facilities 118 may each provide assignment server 122 and/or databases 124 with an indication regarding the relative capacities of each of the vendor facilities 118. Accordingly, assignment server 122 may assign a vendor facility 118 to a caller based upon which facility 118 is able to handle a particular goods or services request of the caller. This example may be useful where vendor facilities in a given area are likely to be constantly receiving calls, such that some of the eligible vendor facilities 118 may be preoccupied with another customer when a call is initiated from a device 102, 104, 106. Additionally, the relative capacity may take into account general trends in business of the vendor facilities. In other words, if a particular vendor facility 118 has fewer users associated with it in a previous caller table, e.g., in one of databases 124, assignment server 122 may assign users to that particular vendor facility 118, thereby generally equalizing the distribution of customers to each of the vendor facilities 118. Any other method or mechanism for distributing customers to the various vendor facilities 118 may be employed that is convenient for a particular network of vendor facilities 118. Process 200 may then proceed to step 220.

As yet another alternative, in step 218d a vendor facility may be assigned in a "round-robin" approach, i.e., where assignment server 122 distributes calls amongst vendor facilities 118 in turn. For example, assignment server 122 may generally track how many calls are directed to each particular vendor facility 118, and assign vendor facilities 118 in such a manner that the overall call volume to the vendor facilities 118 collectively is generally balanced. More specifically, assignment server 122 may increment a counter when a call is transferred to a particular vendor facility 118, and assign subsequent calls only to vendor facilities 118 have a lower count, thereby distributing calls to the vendor facilities 118 generally equally. Where a vendor main office 116 desires to shift a balance of calls in favor of certain vendor facilities 118, a counting method or heuristic may be defined to distribute a greater share of incoming calls to the desired vendor facility/facilities 118. For example, an increment associated with a particular vendor facility 118 may be a multiple of that associated with other vendor facilities 118. More specifically, a counter associated with vendor facility 118a may be incremented by two or three, or any other number, each time a call is connected to vendor facility 118a, such that it will receive a lesser overall share of calls coming to vendor main office 116. Accordingly, a variety of call distribution schemes may be implemented by vendor main office 116 by way of assignment server 122.

Turning back to FIG. 2A, in step 220 the caller is connected with the assigned vendor facility, i.e., the vendor facility 118 assigned in step 218. Assignment server 122 may complete the connection of the call from devices 102, 104, 106 to a particular vendor facility 118 generally without intervention by a vendor main office 116, or knowledge of the caller, such that operation of process 200 is generally transparent to the user. Further, once the caller is connected, where a data line associated with the assigned vendor facility 118 is busy, e.g., the assigned vendor facility 118 is preoccupied with other customers, the caller may be redirected to the vendor main office line 116 for further assistance. Alternatively, the caller may be re-assigned and/or connected with to a second vendor facility 118 identified as an eligible vendor facility 118 in step 212. Process 200 may then proceed to step 222.

In step 222, the result of step 218 may be saved to a previous contact or caller database. For example, the assigned vendor and user may be stored in one of databases 124 for later retrieval by assignment server 122, such that the device 102, 104, 106 is generally associated with the particular vendor facility. Accordingly, subsequent communications such as calls by the user to the vendor main office line 116 will automatically connect the user with the same vendor facility 118 assigned in step 218. This advantageously allows the vendor facility 118 to preserve a customer relationship that may be formed upon initial consultation between the user and the assigned vendor facility 118. Additionally, storage of the result may allow editing by a vendor, e.g., where a vendor facility 118 is closed, a vendor desires to reassign customers, etc. Any other method of associating the assigned vendor facility with the user may be employed. Process 200 may then terminate.

Accordingly, system 100 and process 200 generally may distribute potential customers to a number of vendor facilities 118 that are associated with a particular vendor. Various characteristics of the assignment methodology may be customized for a particular vendor, and may therefore allow a particular vendor to set up a general strategy for distribution of potential customers without requiring customers themselves to contact multiple vendor facilities 118. Further, the system 100 and process 200 generally seamlessly operate to build a relationship between an initially assigned vendor facility 118 and a particular user.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving an initiated communication from an external device to a primary data line of a vendor system, where a plurality of vendor facilities is associated with the vendor system;
detecting a communication identification of the initiated communication to determine a location associated with said external device;
accessing a predetermined range of distance;
determining a first group of vendor facilities from said plurality of vendor facilities, each of said first group of vendor facilities located within said predetermined range of distance from said location;
assigning one of said first group of vendor facilities as of an assigned vendor facility based on said communication identification; and
connecting said initiated communication with a data line of said assigned vendor facility.

2. The method of claim 1, further comprising:
receiving a subsequent initiated communication from the external device to said primary data line;
detecting a subsequent communication identification of the subsequent initiated communication; and
automatically connecting said subsequent initiated communication with said assigned vendor facility.

3. The method of claim 1, wherein assigning said one of said vendor facilities includes randomly selecting one of said first group of vendor facilities.

4. The method of claim 1, wherein assigning said one of said first group of vendor facilities includes selecting a vendor facility based at least upon a proximity of said one of said first group of vendor facilities to said location.

5. The method of claim 1, wherein assigning said one of said first group of vendor facilities includes selecting a vendor facility based at least upon an available capacity of said one of said first group of vendor facilities.

6. The method of claim 5, further comprising receiving an indication of said available capacity from said one of said vendor facilities.

7. The method of claim 1, further comprising distributing said first group of vendor facilities amongst a plurality of initiated communications to said primary data line, thereby generally balancing an overall capacity of said first group of vendor facilities amongst each of said first group of vendor facilities.

8. The method of claim 1, further comprising:
determining a busy status of said assigned vendor facility;
assigning said initiated communication to a second one of said vendor facilities; and
connecting said initiated communication with said second one of said vendor facilities.

9. A communication system comprising:
an assignment server configured to store a vendor facility assignment heuristic for the communication system having a primary data line, where a plurality of vendor facilities is associated with the communication system; and
a plurality of vendor facility data lines in communication with said assignment server, each associated with one of said plurality of vendor facilities;
wherein said assignment server is configured to determine a first group of vendor facilities from said plurality of vendor facilities in response to receiving an initiated communication to said primary data line by being configured to detect a communication identification of the initiated communication, said first group of vendor facilities located within a predetermined range of distance from a location associated with said communication identification, said assignment server configured to assign one of said first group of vendor facilities to said initiated communication and connect said initiated communication with the vendor facility data line associated with said assigned vendor facility.

10. The communication system of claim 9, further comprising a database in communication with said assignment server, said database configured to receive data from said assignment server associating initiated communications with a vendor facility.

11. The communication system of claim 9, wherein said assignment server is configured to assign said one of said first group of vendor facilities to said initiated communication by randomly selecting one of said first group of vendor facilities.

12. The communication system of claim 9, wherein said assignment server is configured to assign said one of said first group of vendor facilities to said initiated communication by determining a proximity of said one of said first group of vendor facilities to said location.

13. The communication system of claim 9, wherein said assignment server is configured to assign said one of said first group of vendor facilities to said initiated communication by determining an available capacity of said one of said first group of vendor facilities.

14. A system, comprising:
an assignment server in communication with a data network, said data network including a primary data line for a vendor, where a plurality of vendor facilities is associated with the data network; and
a plurality of vendor facility data lines, each associated with one of said vendor facilities, said plurality of vendor facility data lines in communication with said assignment server over said data network;
wherein said assignment server is configured to determine a first group of vendor facilities from said plurality of vendor facilities according to a communication identification of an initiated communication to said primary data line, said first group of vendor facilities located within a predetermined range of distance from a location associated with said communication identification, said assignment server configured to assign one of said first group of vendor facilities to said initiated communication and connect said initiated communication with the vendor facility data line associated with said assigned vendor facility.

15. The system of claim 14, wherein said assignment server is configured to assign said one of said first group of vendor facilities to said initiated communication by randomly selecting one of said first group of vendor facilities.

16. The system of claim 14, wherein said assignment server is configured to assign said one of said first group of vendor facilities to said initiated communication according to a proximity of said one of said first group of vendor facilities to said location.

17. The system of claim 14, wherein said assignment server is configured to assign said one of said first group of vendor facilities to said initiated communication according to an available capacity of said one of said first group of vendor facilities.

18. The method of claim 1, wherein said predetermined range of distance is based on an average distribution density of said plurality of vendor facilities in an area of said location associated with said external device.

19. The method of claim 1, wherein said predetermined range of distance is determined by accounting for characteristics of the vendor system and a distribution density of said plurality of vendor facilities in the vendor system.

20. The method of claim 19, wherein said accounting for said characteristics of the vendor system includes at least balancing an overall call volume for the vendor system, and
wherein said accounting for said distribution density of said plurality of vendor facilities includes determining whether said plurality of vendor facilities is concentrated or sparsely distributed relative to the location.

21. The communication system of claim 9, wherein said predetermined range of distance is determined by accounting for characteristics of the communication system and a distribution density of said plurality of vendor facilities in the communication system.

22. The communication system of claim 21, wherein said accounting for said characteristics of the vendor system includes at least balancing an overall call volume for the vendor system, and
wherein said accounting for said distribution density of said plurality of vendor facilities includes determining whether said plurality of vendor facilities is concentrated or sparsely distributed relative to the location.

23. The system of claim 14, wherein said predetermined range of distance is determined by accounting for characteristics of the data network associated with the vendor and a distribution density of said plurality of vendor facilities in the data network.

24. The system of claim 23, wherein said accounting for said characteristics of the vendor system includes at least balancing an overall call volume for the vendor system, and
wherein said accounting for said distribution density of said plurality of vendor facilities includes determining whether said plurality of vendor facilities is concentrated or sparsely distributed relative to the location.

* * * * *

UNITED STATES PATENT AND TRADEMARK OFFICE
CERTIFICATE OF CORRECTION

PATENT NO. : 8,559,617 B2  
APPLICATION NO. : 11/961243  
DATED : October 15, 2013  
INVENTOR(S) : Brent Cramer Page 1 of 1

It is certified that error appears in the above-identified patent and that said Letters Patent is hereby corrected as shown below:

In the Claims

In Claim 1, column 9, line 65, please delete the word "OF" between the words "as" and "an" as follows:

--assigning one of said first group of vendor facilities as [[of]] an--

Signed and Sealed this  
Twenty-sixth Day of November, 2013

Margaret A. Focarino  
*Commissioner for Patents of the United States Patent and Trademark Office*